April 21, 1964
E. LAIMINS
3,130,382
LOAD CELL
Filed April 20, 1962
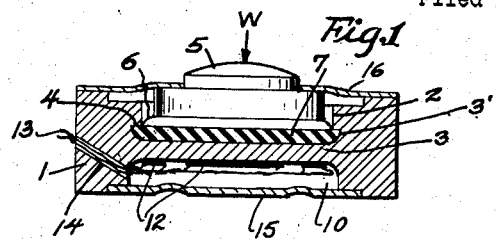
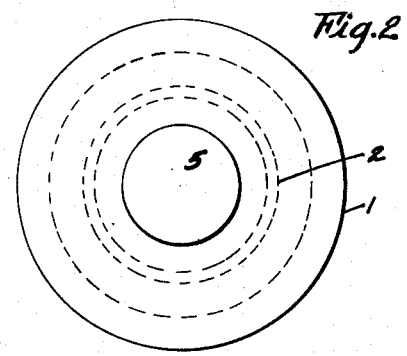
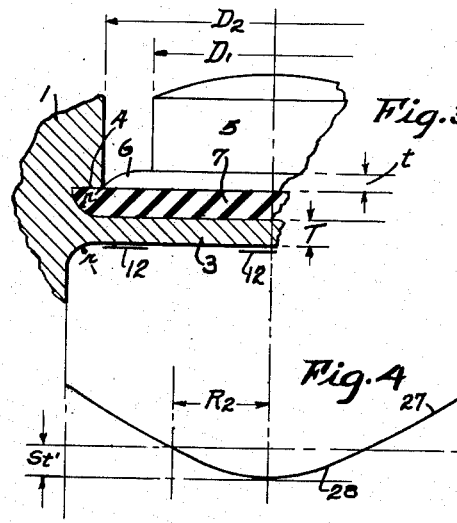
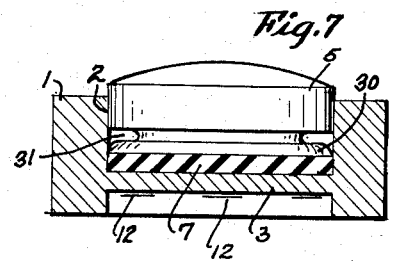
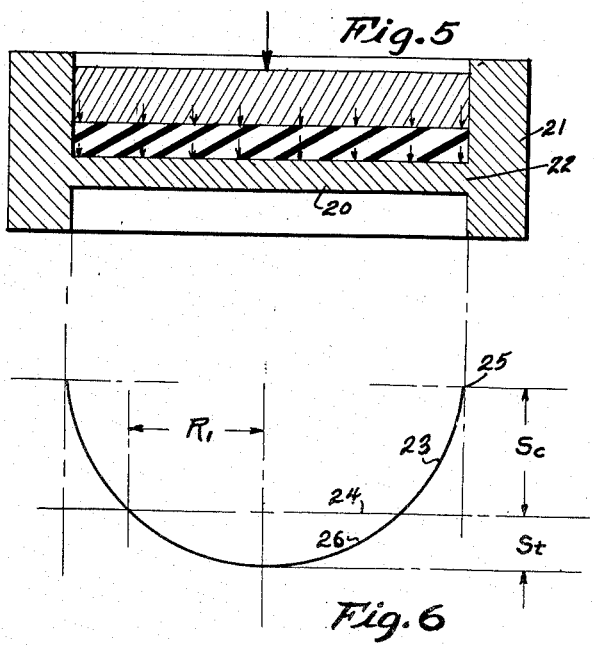
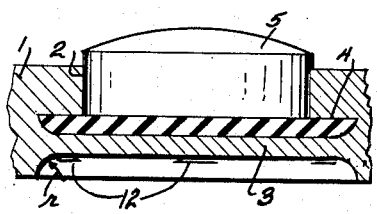
INVENTOR.
Eric Laimins
BY
ATTORNEY ic Office 3,130,382
Patented Apr. 21, 1964

3,130,382
LOAD CELL
Eric Laimins, Cambridge, Mass., assignor to Baldwin-Lima-Hamilton Corporation, a corporation of Pennsylvania
Filed Apr. 20, 1962, Ser. No. 189,153
8 Claims. (Cl. 338—5)

This invention relates to force-measuring cells of a type employing electrical strain-responsive means.

A great many types of electrically-responsive force measuring cells have been proposed and used but they have been relatively large size which has been necessary in order to obtain reasonably accurate and linear strain-responsive characteristics and also have sufficient structural strength to resist eccentric loads and lateral forces. The electrically-responsive means is normally in the form of strain gages preferably of the type having electrical resistance filaments bonded throughout their effective length to the surface of a column or other load-carrying member which is strained in response to load applied to it. The relatively large load cells have prevented their effective use in extremely small spaces. The term "load" or "force" herein broadly includes mechanically and fluid pressure applied forces.

It is an object of my invention to provide an improved electrically-responsive load cell that can ge effectively made in miniaturized form and which will minimize eccentric load and lateral force effects, while still obtaining a high degree of linear relation between load and electrical output.

A further object is to provide such an improved type of load cell that is relatively simple in construction, operation, and maintenance.

Other objects and advantages will be more apparent to those skilled in the art from the following description of the accompanying drawings in which:

FIG. 1 is a cross-sectional view of a preferred embodiment of my improved diaphragm-type force-measuring cell;

FIG. 2 is a plan view of FIG. 1;

FIG. 3 is an enlarged fragmentary sectional view showing the critical portions of my improved load cell whereby I am able to obtain my desired degree of linearity;

FIG. 4 is a diagrammatic curve illustrating the results of my improved type of cell whereby the radial (compressive) and tangential (tensile) stresses in the diaphragm have become nearly equal;

FIG. 5 is a sectional view of a load cell without my improvements and FIG. 6 is a diagrammatic curve illustrating that in such a load cell the radial stresses are larger than the tangential stresses by a factor of approximately two and consequently a non-linear change in the radial stresses will affect the overall linear response of the applied load in the cell; and FIGS. 7 and 8 illustrate how certain elements of my invention could individually improve prior types of cells although not to the extent that is possible where the elements are used in their cooperative manner of the preferred form of my invention.

In the preferred embodiment of my invention shown in FIG. 1, I provide a casing 1 preferably circular in plan view as shown in FIG. 2 and having broadly an axially extending cavity 2 circular in cross section and open at its upper end and closed at its lower end by an annular diaphragm 3, the effective straight surface of the diaphragm being preferably enlarged by the formation of an annular recess 3' which has an overhanging ledge 4. The terms "upper" and "lower" and "downward" and "upward" are used herein in a relative sense inasmuch as the cell can be used in various positions. A load button or piston 5 extends into cavity 2 preferably in radially spaced relation thereto except at its lower end, FIG. 3, wherein the piston has an axially flexible flange 6 that has a close but freely sliding fit with the bore. The casing and piston are made of suitable material such as steel. Disposed within the space between the piston and diaphragm is a pressure pad 7 made of rubber or rubber-like material, the pad completely filling the space between these elements. The piston member 5 rests upon this pad and is preferably cemented thereto with any suitable cement. The result is that the pad 7 entirely fills the space defined by the piston and casing surfaces, and under these circumstances the rubber is completely confined and is capable of transmitting a peculiar distribution of pressure to diaphragm member 3 in a manner to be described. The upper and lower surfaces of the diaphragm are connected into casing 1 preferably by fillets having radii such as $r$, FIG. 3. The magnitude of these fillets is such that the diaphragm surfaces are straight out to a point preferably, but not necessarily, in vertical alignment with the cylindrical portion of the upper wall of cavity 2. I am then able to apply strain gages to the diaphragm, preferably at its underside, as diagrammatically indicated at 12 to measure the load. The strain gages are preferably of the bonded electrical resistance filament type well known in the art and are arranged at the central and peripheral portions of the diaphragm on the same side thereof, and connected together to give a cumulative output, all as shown in the general manner in Patent No. 2,400,467, thereby to take advantage of the tension force in the diaphragm at its central portion and the compression force at the peripheral portion. The gages are mounted on the diaphragm, in the preferred form, substantially within an area that is in alignment with the area of the cylindrical portion of cavity 2. Leads 13 for these various gages extend through a suitable opening 14 in the casing. The diaphragm 3 is freely deflectable by being slightly raised above the lower surface of casing 1, preferably by forming a recess 10 at the bottom of the casing. This also provides a pocket in which the gages may be protected by a suitable cover 15 extending over the recess 10 and suitably secured to the casing by soldering or welding. The recess 10 is of sufficient diameter to permit the lower surface of the diaphragm to have preferably the same extent of straightness as the upper surface. The piston 5 is centered by an annular metal diaphragm 16 suitably welded at its inner edge to the button and at its outer edge to the casing 1. While this diaphragm resists eccentric loads to a certain extent, yet the rubber-like pad 7 by operating with somewhat of a hydrostatic pressure will allow the load receiving and transmitting piston 5 to slightly tilt when subjected to an eccentric load, and yet transmit only a substantially true axial force to the whole diaphragm area.

The improved mode of operation of my load cell by which I obtain a high degree of linearity will be more apparent by comparing its construction as shown in FIG. 3, with a prior construction shown in FIG. 5. In FIG. 3 the annular recess 3' allows for a fillet radius $r$ to avoid stress concentration in the diaphragm near the peripherally located gages and to cause pressure to be applied over the flat diaphragm area only. Also radial pressure in the rubber pad is transmitted to the fillet only and will not affect strain distribution in the flat portion $D_2$, FIG. 3 on the diaphragm but will be localized in the fillet radii only. The peripherally located gages will thus be away from the fillet and from stress concentrations. Also, by having the piston 5 spaced radially inwardly at the bore 2 so as to provide the flange 6, it is possible to further control the linearity by the thickness and radial dimensions of this flange which has a resultant flexibility.

My theory is that the gages located near the largest diameter of the diaphragm for measuring the compressive strains are the "worst offenders" regarding nonlinearity. These gages will "lose output" faster than the centrally located tension gages will gain output as a function of applied pressure. This is believed to be caused by the deflection of the diaphragm under applied pressure. These factors can be controlled by considering, FIG. 3, that the sensitivity (gage output) and the linearity of the gages are determined by the ratio of $T/t$ and/or $D_2/D_1$. The flange flexibility can be controlled in two ways; the thickness of $t$ and the annular area equal to $D_2-D_1$. The required magnitude of control regarding different diaphragm thicknesses T is determined by the ratio $T/t$ and/or $D_2/D_1$. The desired capacity of the cell and output response determines T. The value of $t$ then controls the output linearity for a specific value of $D_2/D_1$. The ratio of $T/t$ is preferably 1.35 to 1.65 and the ratio $D_2/D_1$ is preferably 1.10 to 1.30. If a diaphragm 20, FIG. 5, has its flat surfaces connected directly into the casing 21 as is shown at 22, then the compression stresses in the peripheral portion of the diaphragm 20 rises sharply as at 23 from the axis 24 to a point 25. This represents a maximum compression stress $S_c$ beginning at a radium $R_1$ while the central portion of the diaphragm is in tension as indicated by the line 26 having a maximum stress equal to $S_t$. In my improved construction the stress distribution as shown in FIG. 4 has a maximum compression stress 27 of a magnitude $S_{c'}$, starting at a radius $R_2$ while the maximum tension stress 28 is represented at $S_{t'}$. Thus it is seen that the radial dimension of flange 6 represented by the difference between $D_2$ and $D_1$ will cause the radius $R_2$ of FIG. 4 to be less than the radius $R_1$ of FIG. 6. In other words, as the diameter $D_1$ approaches the diameter $D_{2'}$, the radius $R_2$ will shift outwardly to cause the compression stresses to assume a more rapidly increasing rate of strain as shown at 23, FIG. 6. This shows the influence that the flange 6 has in obtaining the ultimate of minimum nonlinearity and of equalization on stresses $S_c$ and $S_{t'}$. When this is added to the fillet radii so as to obtain a maximum flat area of the diaphragm then a very high degree of linearity is obtained.

In this operation, the application of a downward axial force to the upper end of the piston causes the pad to be subject to compression stress throughout its volume, thereby subjecting the entire upper face of the diaphragm to a positive pressure, but the flexibility of flange 6 or of the diaphragm as created by the filleted extension thereof causes said positive pressure, which is transmitted to the diaphragm, to be greater at the central portion than at the peripheral portion of the diaphragm whereby the ratio of the maximum compressive strain to the maximum tensile strain on the lower face of the diaphragm is smaller than it would be if the upper face of the diaphragm were subject to a uniform hydrostatic pressure. The flange 6 or the filleted extension of the diaphragm broadly constitute means disposed adjacent to the peripheral portion of the diaphragm so that the rubber-like action of the pad causes the positive pressure to be transmitted in the foregoing manner.

Thus, my improved construction incorporates principles of operation that lend a great deal of adaptability to meet demands of various degrees of exactness. Variations from the above ratios, even to the extent that $D_2$ and $D_1$ are substantially equal, as is the case in FIG. 8, would still produce a cell superior to that of FIG. 5 for the reason that recess 3' formed by the undercut 4 with the filleted connections $r$ improves the linearity of the compression gages 12 as compared to the FIG. 5 construction. FIG. 8 also shows how the flat portion of the diaphragm can be enlarged beyond the limits of the cylindrical portion of cavity 2 although the flat portion could be only equal to such cylindrical portion as in FIG. 1. FIG. 7 shows the use of the flexible flange 30 (corresponding to 6) formed by a groove 31 in the piston without the filleted areas $r$. The maximum results of my invention are not obtained by the FIGS. 7 and 8 form as are obtained by FIG. 1 wherein the flexible flange 6 effectively cooperates with the enlarged flat area of diaphragm beneath the flange, created by recess 4 and the filleted connections to the casing, thereby to insure a stress curve that throws the transition of compression to tension stress inwardly to radius $R_2$. This obtains maximum linearity and other desirable features as previously described.

My improved load cell is so effective for carrying and measuring a relatively large load for its size that it allows a high degree of miniaturization with the foregoing very effective linear operation. As one example, a cell has been made with a maximum diameter of 5/8" and 3/8" height for a normal load capacity of 500 lbs., and an overload capacity of 1500 lbs. It is possible to achieve factors such as minimum hysteresis and a high degree of linearity and repeatability, within ½%. Combined with this extraordinary ability for miniaturization with effective functional characteristics is the fact that the cell is relatively economical in manufacture and maintenance.

It will, of course, be understood that various changes in details of construction and arrangement of parts may be made by those skilled in the art without departing from the spirit of the invention as set forth in the appended claims.

I claim:

1. A force-responsive device for measuring the magnitude of a force applied along a given axis, comprising, in combination, a casing surrounding said axis having an axially extending cavity circular in cross-section and open at its upper end and closed at its lower end by a diaphragm, said diaphragm being connected to said casing around its periphery and being free to deflect downward so that application of a positive pressure to the upper face of said diaphragm will produce on its lower face compressive strains around the periphery and tensile strains in the central portion, an axially extending force-receiving and force-transmitting piston extending within said cavity through its upper open end, said piston having an axial slidable fit with the wall of said cavity along at least the lower portion thereof, a rubber-like pressure-transmitting pad disposed between said piston and said diaphragm and substantially completely filling the cavity space contained there-between so that application of a downward axial force to the upper end of said piston causes said pad to be subject to compression stress throughout its volume, thereby subjecting the entire upper face of said diaphragm to a positive pressure, means disposed adjacent to the peripheral portion of said diaphragm so that the rubber-like action of said pad in response to said downward force causes the said positive pressure transmitted by it to said diaphragm, whereby the ratio of the maximum compressive strain to the maximum tensile strain on the lower face of said diaphragm is smaller than it would be if the upper face of the diaphragm were subjected to a uniform hydrostatic pressure, two electrically responsive strain gage means attached to said diaphragm so that one is responsive to the compressive surface strains of the diaphragm while the other is responsive to simultaneous tensile surface strains thereof, both strains resulting from the bending of said diaphragm in response to said downward force, said gages being connectable to provide a single cumulative response to an applied force.

2. The combination set forth in claim 1 further characterized in that the means for causing the positive pressure transmitted to the diaphragm to be greater at the central portion than at the peripheral portion of the diaphragm includes an axially flexible annular flange between the piston and cavity wall and in contact with the rubber-like pad, whereby said ratio of compressive to tensile strains in the diaphragm is obtained.

3. The combination set forth in claim 1 further characterized in that the means for causing the positive pressure transmitted to the diaphragm to be greater at the central portion than at the peripheral portion of the diaphragm includes means whereby the diaphragm is of larger diameter than that of the piston.

4. The combination set forth in claim 1 further characterized in that the means for causing the positive pressure transmitted to the diaphragm to be greater at the central portion than at the peripheral portion of the diaphragm includes at the lower end of the cavity a radially enlarged annular recess into which the rubber pad extends.

5. The combination set forth in claim 1 further characterized in that the means for causing the positive pressure transmitted to the diaphragm to be greater at the central portion than at the peripheral portion of the diaphragm includes at the lower end of the cavity a radially enlarged annular recess into which the rubber pad extends, and the diaphragm is connected into the casing along a curved fillet forming the outer radial boundary of the annular recess.

6. The combination set forth in claim 1 further characterized in that the means for causing the positive pressure transmitted to the diaphragm to be greater at the central portion than at the peripheral portion of the diaphragm comprises an axially flexible annular flange forming the maximum diameter of the piston at its lower end for contacting the rubber-like pad, and the casing having an annular recess extending radially outward from the cavity and into which the rubber pad extends whereby the diaphragm is of larger diameter than that of the flexible flange.

7. The combination set forth in claim 1 further characterized in that the piston has a portion of its length spaced inwardly of said cavity wall, and said piston has an axially flexible flange extending to the cavity wall, the periphery of the diaphragm being connected to the casing by fillet radii of such magnitude that the diaphragm has a flat area substantially equal to the area of the flanged end of the piston and substantially in axial alignment therewith, and the compression responsive strain gages being on the flat portion of said diaphragm near its periphery and the tensile responsive gages being on the central portion of said diaphragm.

8. The combination set forth in claim 1 further characterized by the provision of a radial diaphragm disposed at the upper open end of the casing and secured to the casing and piston for guiding the piston during movement thereof.

References Cited in the file of this patent
UNITED STATES PATENTS

| | | |
|---|---|---|
| 2,472,047 | Ruge | May 31, 1949 |
| 3,095,551 | Hebert | June 25, 1963 |